Patented June 3, 1952

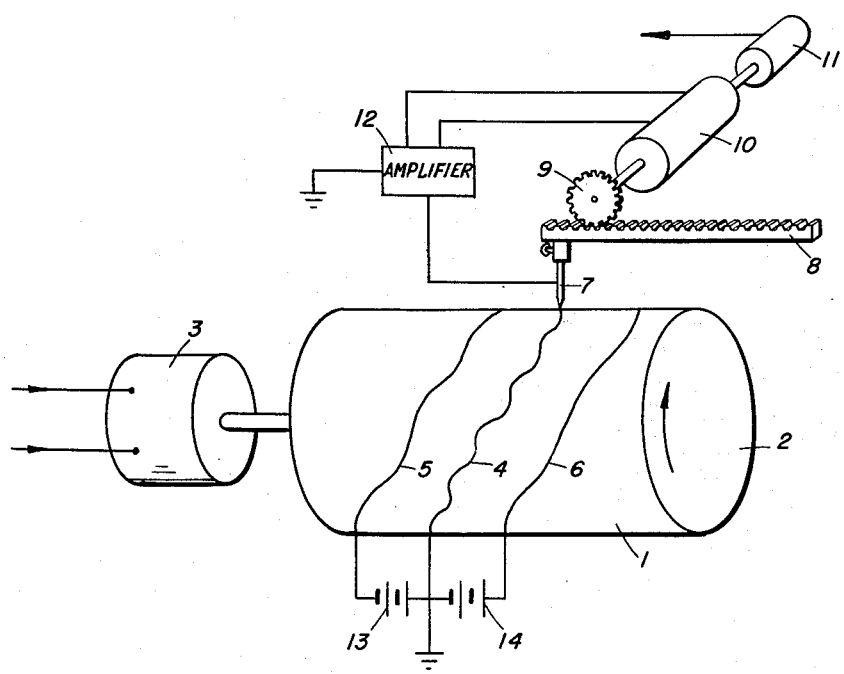

2,598,937

UNITED STATES PATENT OFFICE 2,598,937

CURVE FOLLOWER

Norman F. Parker, Los Angeles, Calif., assignor to North American Aviation, Inc.

Application April 24, 1950, Serial No. 157,677

8 Claims. (Cl. 177—380)

This invention relates to the generation of a displacement or electrical signal whose magnitude is proportional to any function of the magnitude of a preselected variable quantity. Specifically, this invention pertains to a curve follower adapted to generate a voltage proportional to any predetermined function of a second voltage.

Assume that a variable $x$ is plotted against some function of $x$ in rectangular coordinates. If a pointer can be caused to follow the curve defining $f(x)$ and if the position of the pointer can be determined automatically for any value of $x$, it is then not necessary to measure points on the curve corresponding to various values of $x$ in order to obtain the corresponding values of $f(x)$. This invention contemplates a simple and inexpensive scheme for causing a pointer to follow such a curve, and for furnishing continuous information as to the position of the pointer in the $f(x)$ direction.

In the design of curve following devices it is desirable that the pickoff or sensing device be simple, that the ratio of signal power-to-noise level be large, that the surface upon which the function is plotted be inexpensive and easy to prepare, and that the per-unit resolution of the combined function sheet and pickoff be small.

It is therefore an object of this invention to provide a curve follower having high resolution.

It is a further object of this invention to provide a simple curve-following device with relatively high signal power.

It is a further object of this invention to provide a curve-following device employing a function sheet which is inexpensive and easy to prepare.

Other objects of invention will become apparent from the following description taken in connection with the accompanying single figure, which is a schematic diagram of the invention.

Referring to the single figure, a rectangular function sheet 1 is wound on a drum 2 rotatable about its cylindrical axis by means of motor 3. A curve 4, representing a plot of $f(x)$ against $x$, is drawn on function sheet 1 with boundary curves 5 and 6 drawn on either side thereof and roughly parallel thereto. A conducting pointer 7 supported non-conductively on a rack 8 is required to follow curve 4 in a manner to be hereinafter related. Rack 8 is driven along the cylindrical axis of drum 2 in a direction to be hereinafter denoted the $f(x)$ direction, by a gear 9 driven by a motor 10. Motor 10 is drivingly connected to an angular pickoff 11 and is driven by an amplifier 12 adapted to amplify signals derived from pointer 7. Curves 4, 5 and 6 are related by batteries 13 and 14. Curve 4 is maintained at ground potential, while curve 5 is connected to the negative terminal of battery 13 and curve 6 is connected to the positive terminal of battery 14. The positive terminal of battery 13 and the negative terminal of battery 14 are connected to curve 4 and to ground by slip rings or other conventional devices (not shown), as required. If function sheet 1 is wrapped on drum 2 in the manner required to orient the $x$ axis around the circumference of drum 2 and the $f(x)$ axis along the cylindrical axis of drum 2, the displacement of motor 3 by an amount proportional to $x$ will cause pointer 7 to be positioned in the general vicinity of the curve $f(x)$. Boundary curves 5 and 6 are drawn roughly parallel to curve 4, and are drawn with a material which is a good conductor of electricity, such as silver paint. Curve 4, likewise, is drawn with a good conductor, such as silver paint, and function sheet 1 is composed of a relatively high resistivity conducting material such as Western Union paper or conducting glass. The resistivity of the material may vary widely, a typical value being 20000 ohms per square. If pointer 7 makes electrical contact anywhere on function sheet 1 except on curve 4 it will pick off a definite signal voltage whose magnitude depends at least in part upon the distance between pointer 7 and curve 4. If pointer 7 is displaced from curve 4 on the side nearest curve 5 it will sense a negative voltage. If, however, pointer 7 is displaced from curve 4 toward or beyond curve 6, a positive voltage will be reflected thereon. Since curve 4 is at ground potential, a potential gradient from extreme negative at and beyond curve 5 to zero at curve 4 to extreme positive at and beyond curve 6 exists. Therefore, the closer pointer 7 gets to curve 4 the smaller the voltage detected by pointer 7 will be. Whatever voltage appears on pointer 7 is conducted to amplifier 12, which is a servo amplifier adapted to drive motor 10. Motor 10 is arranged to turn in the direction required to move pointer 7 toward curve 4 by means of gear 9 and rack 8. If the voltage picked up by pointer 7 and amplified by amplifier 12 is negative, indicating that the pointer is on the curve 5 side of curve 4, motor 10 turns counterclockwise, bringing pointer 7 back to curve 4. But if the voltage picked up by pointer 7 and amplified by amplifier 12 is positive, thereby indicating that pointer 7 is somewhere on the curve 6 side of curve 4, motor 10 turns clockwise, bringing pointer 7 back to contact with curve 4. The angular motion of motor 10 is detected by angular pickoff 11. Since the angular motion of motor 10 is proportional to the displacement of pointer 7, the output of angular pickoff 11 is also proportional to the position of pointer 7. Since motor 10 tends to keep pointer 7 always positioned on curve 4, the result is that the output of angular pickoff 11 is proportional to $f(x)$, where $x$ is the displacement of drum 2 as produced by motor 3. If drum 2 is caused to move continuously, pointer 7 will be caused to follow curve 4 continuously, and angular pickoff 11 will furnish values of $f(x)$ continuously.

Function sheet 1 is quickly and cheaply prepared with ordinary drawing or writing instruments by drawing curves on Western Union paper or any other relatively high resistivity conducting surface, using silver paint or some other low resistivity medium. Boundary curves 5 and 6 need not be drawn with any great accuracy since they need to be only roughly parallel to curve 4.

Alternatively, conducting glass may be used where it is desired to keep a permanent record of the curves. While the single figure shows an embodiment of the invention, with Western Union paper or other flexible material used as the function sheet, it is obvious that a rigid medium may be used with equal facility by employing a rack adapted to drive the function sheet in the $x$ direction by means of motor 3.

Since the relative resistivities of function sheet 1 and curves 4, 5 and 6 are greatly different, it follows that the per-unit resolution of the device is extremely small. Curve 4 may be drawn extremely thin, and yet, because it is of very low resistivity material, a slight deviation of pointer 7 from the curve will cause an appreciable signal to be delivered to amplifier 12. Pointer 7, therefore, tends to follow curve 4 exactly. Pointer 7 may be simply a graphite pencil or a metallic sharpened pointer. Because batteries 13 and 14 may be made fairly large with respect to the threshold of amplifier 12, a signal-to-noise ratio of the device is adequately large and the device as a whole is extremely dependable.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Means for generating a variable proportional to any predetermined function of a second variable comprising a conducting surface having a definite predetermined resistance to the flow of electric current, a low resistance conducting line on said surface representing a plot of said function against said second variable, a second conducting line on said surface roughly parallel to said first line and removed from said first line a predetermined distance on one side thereof, a third conducting line roughly parallel to said first line and removed from said first line a predetermined distance on the other side thereof, means for moving said surface in the direction in which said second variable is plotted thereon, a conducting pointer for making electrical contact with said surface, means for applying voltages of opposite sign to the second and third of said conducting lines with said first conducting line grounded, motor means for moving said conducting pointer in the direction in which said function is plotted, amplifier means for turning said motor means in the sense required to return said pointer to said first conducting line in response to voltage on said conducting pointer, and means for detecting the angular motion of said motor means whereby said detected angular motion is proportional to said predetermined function of said second variable.

2. In combination with a curve inscribed on a resistive conducting surface in ink of high conductivity, a pair of boundary curves inscribed in said high conductivity ink on either side of said first-named curve; a conducting pointer adapted to contact said conducting surface; means for applying opposing voltages to said pair of curves; and servo means responsive to the voltage on said pointer for keeping said pointer positioned on said first-named curve during movement of said conducting surface.

3. A device as recited in claim 2 and further comprising pickoff means for detecting at least one component of the motion of said pointer to thereby indicate the position of said pointer.

4. Means for producing an electrical signal proportional to any function of a single variable comprising a curve of said function plotted in rectangular coordinates against said variable with ink having high electrical conductivity, a surface for plotting said curve having lower electrical conductivity than said ink, a pair of conducting boundary curves plotted on said surface on either side of said first-named curve, means for applying voltages of opposite polarity to said boundary curves, a conducting pointer adapted to contact said conducting surface, means for causing relative motion between said curves and said pointer in the direction in which said single variable is plotted, servo means responsive to the voltage on said pointer for positioning said pointer on said first-named curve during said relative motion, and electrical pickoff means for detecting the motion of said pointer in the direction in which said function is plotted to thereby produce an electrical signal continuously proportional to said function of said single variable.

5. Means for causing a conducting pointer to follow a line of low resistivity conducting material on a conductive surface of higher resistivity than said line comprising means for imparting to said surface a motion having a component along said line, a pair of low resistivity conducting lines drawn roughly parallel to said first-named line and on either side thereof, means for applying voltages of opposite sign to said last-named lines, and servo means for moving said pointer with a component of motion normal to said first-named motion in response to voltage on said pointer in the sense required to reduce said voltage to zero to thereby cause said pointer to follow said first-named line.

6. A device as recited in claim 5 in which said first-named means for imparting motion to said surface comprises a cylindrical drum and a motor to turn said drum, and in which said servo means comprises a rack placed parallel to the cylindrical axis of said drum and adjacent to said drum for supporting said pointer; and reversible geared motor means responsive to voltage picked up by said pointer for moving said rack to thereby keep said pointer positioned on said first-named line.

7. A device as recited in claim 5 and further comprising pickoff means for generating a voltage proportional to the motion of said pointer normal to said first-named motion to thereby produce a signal proportional to the function of said first-named motion of which said first-named line is a plot.

8. Function generating means comprising a high resistivity conducting surface, a curve drawn on said surface in low resistivity conducting material representing a plot of a variable against some function of said variable, a pair of curves drawn on said surface on either side of said first-named curve in said low resistivity conducting material and roughly parallel thereto, means for applying to said last-named two curves voltages of opposite polarity a conducting pointer for contacting said surface electrically, position pickoff means for producing a signal proportional to the position of said pointer in the direction in which said function is plotted, and servo means responsive to the voltage on said pointer for keeping said pointer on said first-named curve whereby, when said surface is moved in the direction in which said variable is plotted thereon said position pickoff generates a signal proportional to said function of said variable as represented by said first-named curve.

NORMAN F. PARKER.

REFERENCES CITED

The following references are of record in the file of this patent:

UNITED STATES PATENTS

| Number | Name | Date |
| --- | --- | --- |
| 2,371,415 | Tolson | Mar. 13, 1945 |
| 2,411,513 | Bergier et al. | Nov. 26, 1946 |